(12) United States Patent
Manicke et al.

(10) Patent No.: US 6,631,304 B2
(45) Date of Patent: Oct. 7, 2003

(54) METHOD AND SYSTEM FOR CONSTRUCTING TECHNICAL PLANS

(75) Inventors: Paul Stephen Manicke, West Chester, OH (US); Roswitha Sue Ann Schneider, Reading, OH (US); Theodore Robert Grossman, Hamilton, OH (US); Stephen Wayne Tefft, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 09/845,445

(22) Filed: Apr. 30, 2001

(65) Prior Publication Data

US 2002/0161463 A1 Oct. 31, 2002

(51) Int. Cl.[7] ............................. G06F 19/00; G06N 5/02
(52) U.S. Cl. ........................ 700/103; 700/104; 706/47
(58) Field of Search ......................... 700/97, 103, 104; 705/29; 706/47

(56) References Cited

U.S. PATENT DOCUMENTS

| | | | | |
|---|---|---|---|---|
| 5,687,094 A | * | 11/1997 | Kagawa et al. | 716/5 |
| 6,438,435 B1 | * | 8/2002 | Wada et al. | 700/97 |
| 6,438,439 B1 | * | 8/2002 | Barna et al. | 700/121 |
| 6,553,360 B1 | * | 4/2003 | Hoekstra | 706/47 |
| 2001/0034562 A1 | * | 10/2001 | Aumer et al. | 700/97 |
| 2002/0103557 A1 | * | 8/2002 | Land | 700/96 |
| 2002/0147517 A1 | * | 10/2002 | Messler | 700/97 |

* cited by examiner

Primary Examiner—Leo Picard
Assistant Examiner—Elliot Frank
(74) Attorney, Agent, or Firm—William Scott Andes; Pierce Atwood

(57) ABSTRACT

A system and method of using at least one computer to construct a technical plan for a specific process. The invention includes providing a rule-based logic model for the specific process and inputting data relating to the specific process. The data is compared to the logic model to identify exceptions in the data to rules in the logic model. The data are formatted into a technical plan that includes the exceptions. The technical plan is then outputted for review.

14 Claims, 3 Drawing Sheets

Specification_10201_ Technical Plan Template

Source: Source Qualification:
Primary: ABC Aerobitz 10201 Qualified
Subcontract Source(s): XYZ Holemakers Qualification Pending Part number: C50T137
Part Name: Inco718
Engine Program: Wrought Nickel Alloys
Part Material: Material Look-up Suggestions:
Common Name: Inconel 718
Material Classification: Wrought Nickel Alloys Hole Blueprint Zone: 0.3234
Final Hole Diameter (inches): + .001  − .002
Diameter Tolerance:
Hole Length (inches):
Number of Holes: C
10201 Class:
Technical Plan Revision:
Date:

Equipment: Equipment Qualification:
2 Metal Muncher 2000 10201: Qualified
3 ZippyDrill Qualification Pending
4
5 Source:
6 ABC Aerobitz
7 XYZ Holemakers
8

Instructions / 1 Source / 2 Process / 3 Summary / Revision History /

FIG. 2

Feature Summary:
| 10201 | Class C | Part #: |
|---|---|---|
| Material: Wrought Nickel Alloys | | |
| Feature: 0.3234 + 0.001 − 0.002 | | |

| | 1 | 2 | 3 | 4 |
|---|---|---|---|---|
| Process Step: | | | | |
| Process: | | | | |
| Source: | | | | |
| Subcontract Process: | | | | |
| Equipment: | | | | |
| In-Process Dimension (inches): | | | | |
| Chamfer/Radius Dim. (inches): | | | | |
| Tool Number: | | | | |
| Tool Material: | | | | |
| Tool Manufacturer: | | | | |
| Nominal Tool Dia. (inshes): | | | | |
| Number of Tool Flutes: | | | | |
| Regrind Limits: | | | | |
| Tool Change Point: | | | | |
| Tool Speed (rpm): | | | | |
| Tool Feed (ipm): | | | | |
| Coolant Type: | | | | |
| Coolant Application: | | | | |
| Coolant Pressure (psi): | | | | |
| Monitor Yellow Limit (mV): | | | | |
| Monitor Red Limit (mV): | | | | |
| Source/Approval of Monitor Limits: | | | | |
| Grit Size: | | | | |
| Abrasive Concentration: | | | | |
| Bond or Abrasive Carrier: | | | | |
| Stroke Rate (strokes/min): | | | | |

\Instructions \ 1 Source \ 2 Process \ 3 Summary \ Revision History

OUTPUT—30

FIG. 3

METHOD AND SYSTEM FOR CONSTRUCTING TECHNICAL PLANS

BACKGROUND OF THE INVENTION

This invention relates generally to technical plans for manufacturing and other processes and more particularly to automatically constructing such technical plans.

In providing products or services, there are typically many requirements that must be met to produce products and services that meet expectations. Some examples of such requirements include specification requirements that apply to component manufacture or repair, standard design requirements that apply to a specific design activity, and quality requirements that apply to a specific manufacturing or repair process.

To insure that a process (be it a manufacturing, repair or similar process) as practiced conforms to the applicable requirements, engineering specifications often require that a technical plan be made for the process. A technical plan is an overview of a process that sets forth what the process is, how it will be performed, what quality controls will be used, and how various requirements from the drawings and/or specification will be met.

Currently, a user must manually develop a technical plan for each process. However, the quantity and quality of information provided is generally not standardized among users, and individual users tend to develop unique formats. This can result in variability wherein some technical plans are incomplete or otherwise insufficient. Variability in technical plans can be particularly troublesome where an OEM (original equipment manufacturer) procures components manufactured by various suppliers. In this case, the supplier of a particular part will typically generate a proposed technical plan that is submitted to the OEM for review. The OEM will either approve the technical plan as submitted or request changes until a final technical plan is developed. Because suppliers differ in approach to writing technical plans, many reviews and revisions are usually needed before a final technical plan is accepted. The current approach thus results in lost productivity and increased costs.

Accordingly, it would be desirable to have a system and method of developing technical plans that avoid the problems of the current approach.

BRIEF SUMMARY OF THE INVENTION

The above-mentioned need is met by the present invention, which provides a system and method of using at least one computer to construct a technical plan for a specific process. The invention includes providing a rule-based logic model for the specific process and inputting data relating to the specific process. The data is compared to the logic model to identify exceptions in the data to rules in the logic model. The data are formatted into a technical plan that includes the exceptions. The technical plan is then outputted for review.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

FIG. 2 graphically illustrates a user interface screen displaying a first input screen.

FIG. 3 graphically illustrates a user interface screen displaying a second input screen.

DETAILED DESCRIPTION OF THE INVENTION

Figure 1:
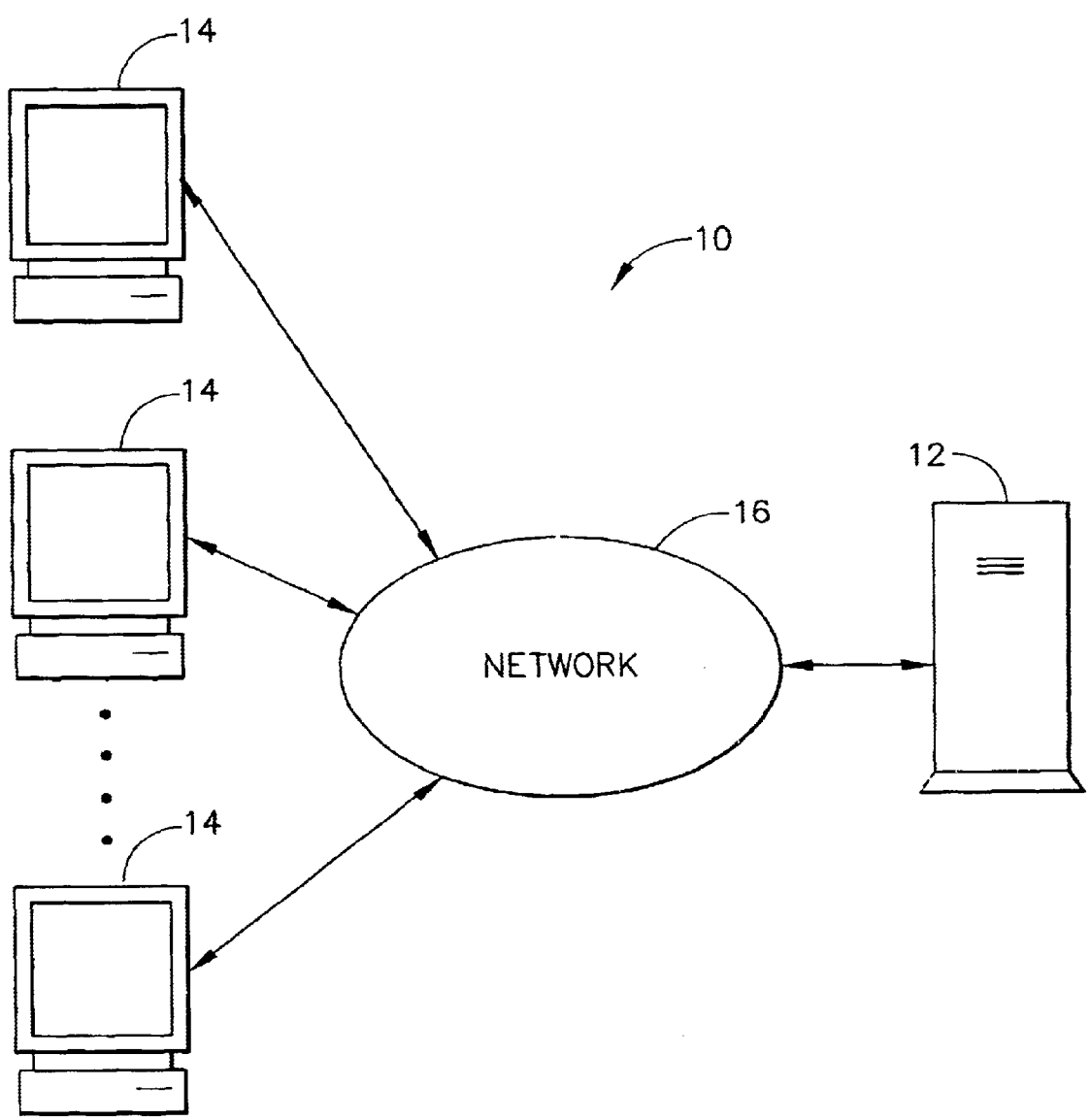
FIG. 1 is a block diagram of a computer-based system for automatically constructing technical plans.

The present invention includes a computer-based system for automatically constructing technical plans. In one preferred embodiment, the computer-based system includes a computer program, referred to herein as the logic processing software, that is configured to accept pertinent data inputs from a user and then automatically construct a technical plan that is appropriate to the particular situation as identified by the user's inputs.

Prior to using the system, the user first obtains any documentation that is to be used in generating the technical plan. By way of example, documents such as a part's engineering specifications and drawings would be used when devising a process for manufacturing the part. Once the appropriate documents have been obtained, the user is ready to access the system. As will be described in more detail below, the system can be accessed in a variety of manners, such as via the Internet or locally via software resident on the user's computer or storage media such as a floppy disk or CD-ROM.

Upon access to the system, the user is presented with one or more input screens. The input screens prompt the user for information that describes the particular process and/or part with which the user is dealing. For example, the information provided by the user could include part number, part name, manufacturing site, base material, specifications required by the part drawing, process parameters, quality information and equipment to be used in the proposed process. The user may obtain this information by referring to the documentation obtained prior to accessing the system. The user directly inputs the required information into fields or selects the appropriate choices from pull-down menus. Illustrations may be provided to assist the user in understanding what information is being requested.

As the information is inputted, the logic processing software compares the information against a rule-based logic model for the applicable process. The logic model, which may be in the form of a decision tree or spreadsheet or a combination of both, is an interpretation of the engineering specification of the process for which the technical plan is being constructed. For example, the logic model can include predetermined acceptable ranges and values for processing a part to be manufactured given the specific inputted information. The logic processing software formats the inputted data into a technical plan and outputs a preliminary technical plan document where exceptions to the rules contained in the logic model are identified. Once the user has considered the exceptions and modified the inputs as appropriate to address the exceptions, the system is directed to output a completed technical plan that is submitted for review. The system will produce technical plans in a standardized format regardless of the individual user. Thus, the system is able to construct technical plans with a minimal number of reviews and revisions as compared to conventional approaches.

Referring now to the drawings wherein identical reference numerals denote the same elements throughout the various views, FIG. 1 shows one embodiment of a computer-based system 10 that uses the above-mentioned logic processing software for constructing technical plans. The system 10 includes a central host or server computer 12 and one or more user computers 14 connected by a computer network 16. In one preferred embodiment, the network 16 is the World Wide Web, although it possible to employ other types of computer networks such as a local area network or a wide area network.

As used herein, the "World Wide Web" (or simply the "Web") refers to the distributed collection of interlinked, computer viewable hypertext documents (commonly referred to as web pages) that are accessible via the Internet. As is known in the art, such hypertext documents are accessed with client and server software using standard Internet protocols such as Transmission Control Protocol/ Internet Protocol (TCP/IP) and Hypertext Transport Protocol (HTTP). Currently, HTTP is the primary protocol for allowing applications to locate and acquire web pages, and web pages are notated with Hypertext Markup Language (HTML). However, as used herein, the terms "World Wide Web" and "Web" are intended to encompass not only HTTP and HTML, but also any current or future transport protocols or markup languages that may be used in place of, or in addition to, HTTP and HTML.

The user computers 14 may be any type of computing devices that are capable of transmitting requests and receiving web pages over the network 16. For example, the user computers 12 can be personal or work station computers having a central processing unit (CPU), a hard disk and one or more auxiliary disk drives for computer-readable storage media such as floppy disks, CD-ROMs or other optical media, magnetic tapes and the like. As is known in the art, the user computers 12 will typically include known input/output devices such as a keyboard, a pointing device, a monitor and a printer. A communication device, such as a modem, is included for providing the computers 12 with a connection to the computer network 16. Those skilled in the art will appreciate that the present invention is not limited to personal or work station computers and can be implemented on other types of computer systems such as main frame computers, laptop computers and personal digital assistants including wireless handheld computers.

The server computer 12 includes a web server (i.e., logic processing software that serves requested HTML pages or files), and each user computer 14 includes conventional web browser software that allows the user computers 14 to access the web pages stored on the server computer 12, as well as other data stored on any other server systems connected to the network 16. Generally, the web server receives requests to access web pages from one or more of the user computers 14 and provides the web pages to the requesting user computers 14. The server computer 12 also has the above-mentioned logic processing software for constructing technical plans.

To utilize the system 10, a user accesses the logic processing software on the server computer 12 with one of the user computers 14. Specifically, the user is able to access and launch the logic processing software by sending a request to the server computer 12 by inputting the appropriate Internet address or selecting the appropriate link on a web page. The server computer 12 responds by downloading a user interface screen that is displayed on the requesting user computer 14. The user enters the required data and submits it back to the server computer 12. The server computer 12 processes the inputs provided by the user, compares the inputs against the logic model resident on the server computer 12, and outputs to the user computer 14 the preliminary technical plan. The user considers any exceptions identified in the preliminary technical plan and submits any desired changes to the input data to the server computer 12. The server computer 12 re-processes the inputs provided by the user and outputs to the user computer 14 the completed technical plan.

With this arrangement, the logic processing software can also be accessed by other users at other locations using one of the other user computers 14. This provides a distributed system that is capable of uniform distribution of the logic processing software to a number of sites. This embodiment is configured so that the logic processing is done on the server computer 12. In this configuration, the system 10 is able to provide security for the logic models and minimizes the amount of data that is transferred over the network 16. The central control of the logic processing software also ensures that all users are utilizing the latest revision.

In one alternative, the logic processing software can be downloaded to the user computer 14 via the network 16 each time the user uses the system 10. In this case, the user submits a request to use the system 10 to the server computer 12 and the server computer 12 responds by downloading the logic processing software to the user computer 12. The logic processing software is not copied to the hard disk but rather is retained with the user computer's RAM for use during that session. Thus, the logic processing is done on the user computer 14 rather than the server computer 12. When the user is finished and exits the software, it must be downloaded once again from the server computer 12 to establish another session. While this approach does not provide the same security for the logic models as the previously described configuration, it does ensure that the latest revision of the logic processing software is used. Another alternative would be to download the logic processing software from the server computer 12 to the user computer local disk drive memory via the network 16. From that point on, the user can repeatedly run the logic processing software on the user computer 14 without further download, except as needed for updates.

In an alternative embodiment, the system 10 can be implemented as a standalone computer system rather than a web-based system. In this case, the system 10 would essentially comprise a single computer, such as one of the user computers 14 described above. As previously discussed, this could include personal or work station computers having a CPU, a hard disk, one or more auxiliary disk drives for computer-readable media such as floppy disks, CD-ROMs or other optical media, magnetic tapes and the like, and known input/output devices. Other types of computer systems such as main frame computers, laptop computers and personal digital assistants including wireless handheld computers could also be used. The logic processing software could be accessed from a removable computer-readable medium, such as a floppy disk, CD-ROM or other optical medium, magnetic tape or the like, inserted into the appropriate drive. With this approach, the logic processing software could be accessed directly from the removable computer-readable medium, or it could be transferred to the computer's hard disk and accessed from there. As used herein, the term "computer-readable medium" refers generally to any medium from which stored data can be read by a computer. This includes not only removable media such as the aforementioned floppy disk or CD-ROM, but also non-removable media such as the hard disk.

As mentioned above, a user utilizes the system 10 by accessing and launching the logic processing software with one of the user computers 14 (as either a networked or standalone computer). Once launched, the logic processing software generates a user interface screen 18, shown in FIGS. 2 and 3, that is displayed on the monitor of the user computer 14. The user interface screen 18 is a graphical user interface that guides the user through the steps of the technical plan construction process. By way of example, a user interface screen used in connection with a holemaking process will be described herein. This is applicable to situations such as where, in the manufacture of a part, the engineering drawing for the part sets forth that one or more holes are to be made in accordance with a specific holemaking specification. In which case, the system 10 can used to construct a technical plan for performing the holemaking process. While the illustrated example pertains to a holemaking process, it should be noted that the present invention is not so limited and can be used with a wide variety of specifications and processes.

The interface screen 18 includes a series of tabs 20–24 along the bottom thereof. The user can selectively choose among the tabs to display a variety of specific screens in the user interface screen 18. Selecting the "Instructions" tab 20 will cause an instruction screen to be displayed. This screen provides general instructions that assist the user in using the system 10 to construct a technical plan.

Selecting the "Source" tab 21 will cause a first input screen to be displayed. As shown in FIG. 2, the first input screen includes a number of input windows that allow the user to enter information relating to the part being manufactured and the manufacturing source or supplier. Each of the input windows is labeled with a description of the type of data to be entered to guide the user in entering the proper data therein. The data are entered (with input peripherals such as a pointing device and/or keyboard) by selecting inputs from a pull-down menu of items or by directly entering information into the input window. The input windows are designed to elicit from the user all the information that is needed to construct the technical plan.

For convenience, the input windows are arranged into first and second primary groups 26 and 28. The first group 26 contains a first subset of input windows in which information relating to the primary and subtier sources of the part and whether each source is qualified for the relevant holemaking specification (which is identified as specification number 10201 in the Figures). A second subset of input windows is provided for obtaining information about the part in which the holes are formed, such as part number, name, material, etc. A third subset of input windows is provided for obtaining information specific to the holes, such as diameter, tolerances, hole length, number of holes and specification class.

The second group 28 of input windows collects information about the equipment to be used in the holemaking process. For each piece of equipment identified in the second group 28, the user also indicates whether the equipment has been qualified for the relevant specification and which source will be using the equipment.

Selecting the "Process" tab 22 will cause a second input screen, which is shown in FIG. 3, to be displayed in the user interface screen 18. The second input screen contains a plurality of input windows used to obtain information describing the proposed procedure for performing the holemaking process. The input windows are arranged in a number of rows and columns where each row is labeled with a description of a process parameter to be entered into the input windows of that row. Each column corresponds to a particular step in the overall process. Thus, the user would enter the appropriate process parameters in the first column for the first process step, in the second column for the second process step, and so on. While only four columns are shown in FIG. 3, it should be noted that any number of columns could be provided.

Only the pertinent input windows for each step need to have data entered. For example, if a step involved an abrading operation, then process parameters such as grit size, abrasive concentration, bond or abrasive carrier and stroke rate, in addition to general parameters such as process step number, process, source, etc., would be entered in the corresponding column. If a step involved drilling, then specific process parameters such as tool speed and tool feed rate would be entered in that column. As with the first input screen, the data are entered (with input peripherals such as a pointing device and/or keyboard) by selecting inputs from a pull-down menu of items or by directly entering information into the input window.

It is emphasized that the present invention is not limited to the particular input screens shown in FIGS. 2 and 3, which are merely presented as one example to facilitate description of the present invention. It should be understood that the configuration of the input screens, and the data received therein, will vary depending on the process or specification for which the technical plan is being constructed.

In operation, the user accesses the system 10 in the manner described above and then enters all pertinent data via the first and second input screens. As the input data is being entered, the logic processing software compares the data against the appropriate logic model and formats the information into a technical plan. The technical plan is continually updated as data is entered.

After the information has been entered, the user can cause the preliminary technical plan to be output. There are two options for achieving this: selecting the "Summary" tab 23 or selecting an "Output" button 30 near the bottom of the second input screen. Selecting the "Summary" tab 23 causes an output screen showing the preliminary technical plan to be displayed. Selecting the "Output" button 30 also causes an output screen showing the preliminary technical plan to be displayed and reformats the technical plan into a formatted file appropriate for use with standard word processing software. While both the "Summary" tab 23 and the "Output" button 30 are shown in the Figures, it should be noted that the present invention could be configured to contain only one or the other of these two output options.

The preliminary technical plan identifies any exceptions to the logic model rules that are detected by the logic processing software. As used herein, "exceptions" refer to a required data field for which no data was entered or to entered data that falls outside of an acceptable range or value defined by the logic model. For example, if the user choose a particular piece of equipment that had an acceptable tool speed in the range of 10,000–40,000 rpm and also entered a tool speed of 60,000 rpm, then an exception would be noted on the preliminary technical plan. Exceptions can be noted in any suitable manner, such as highlighting the excepted data on the output screen.

The user considers the exceptions and makes any appropriate corrections. Continuing the above example, the user would change the 60,000 rpm tool speed to a speed within the acceptable range or choose a different piece of equipment. In some circumstances the user can override exceptions. Once all of the exceptions have been addressed, the user causes the system 10 to output a completed technical plan by again selecting either the "Summary" tab 23 or the "Output" button 30. The completed technical plan provides an overview of the process that the user is proposing be used to meet the specification. The technical plan, which includes all information needed for review, can incorporate drawings, pictures and links to accessible computer files.

The user interface screen 18 further includes the "Revision History" tab 24. Selecting the "Revision History" tab 24 will display a screen showing the history of changes and revisions made to the technical plan since the original issue.

As mentioned above, the logic processing software uses a logic model of rules in constructing a technical plan for a particular specification. Thus, logic models are provided for a number of specifications. Each logic model sets forth the acceptable ranges and values applicable to performing the process of the corresponding specification. The logic models are created by one or more experts that determine the acceptable process parameter ranges. The logic models thus provide consistent and accurate interpretations of the specifications.

The foregoing has described a system and method for automatically constructing technical plans. While specific embodiments of the present invention have been described, it will be apparent to those skilled in the art that various modifications thereto can be made without departing from the spirit and scope of the invention as defined in the appended claims.

What is claimed is:

1. A method of using at least one computer to construct a technical plan for a specific process, said method comprising:

providing a rule-based logic model for said specific process;

inputting data relating to said specific process;

comparing said data to said logic model;

identifying exceptions in said data to rules in said logic model;

formatting said data into a technical plan that includes said exceptions; and outputting said technical plan.

2. The method of claim 1 wherein inputting data includes:

displaying a user interface screen on a computer, said user interface screen including a plurality of input windows; and entering data in one or more of said input windows.

3. The method of claim 1 further comprising addressing said exceptions.

4. The method of claim 3 wherein addressing said exceptions comprises inputting modified data.

5. The method of claim 4 further comprising:

formatting said modified data into a revised technical plan; and outputting said revised technical plan.

6. The method of claim 1 wherein said logic model is stored on a first computer and said data is inputted with a second computer, said first and second computers being connected by a computer network.

7. A computer-based system for constructing a technical plan for a specific process, said system comprising:

means for storing a rule-based logic model for said specific process;

means for receiving data relating to said specific process;

means for comparing said data to said logic model to identify exceptions in said data to rules in said logic model;

means for formatting said data into a technical plan that includes said exceptions; and means for outputting said technical plan.

8. The computer-based system of claim 7 wherein said means for receiving data includes means for displaying a user interface screen on a computer, said user interface screen including at least one input window in which data can be entered.

9. The computer-based system of claim 8 wherein said user interface screen further includes a plurality of different viewable screens.

10. The computer-based system of claim 7 wherein said means for storing a rule-based logic model for said specific process includes logic models for other processes.

11. The computer-based system of claim 7 wherein said means for storing a rule-based logic model resides on a first computer and said means for receiving data resides on a second computer, said first and second computers being connected by a computer network.

12. A computer-readable medium containing instructions for controlling a computer-based system to perform a method of constructing a technical plan for a specific process wherein said method comprises:

providing a rule-based logic model for said specific process;

inputting data relating to said specific process;

comparing said data to said logic model;

identifying exceptions in said data to rules in said logic model;

formatting said data into a technical plan that includes said exceptions; and outputting said technical plan.

13. The computer-readable medium of claim 12 wherein said instructions cause said computer-based system to receive data by displaying a user interface screen on a computer, said user interface screen including at least one input window in which data can be entered.

14. The computer-readable medium of claim 12 wherein said instructions cause said computer-based system to compare said data to a rule-based logic model for said specific process and identify exceptions in said data to rules in said logic model.

* * * * *